Oct. 28, 1958   W. HAWKE   2,858,358
CLAMPING GLANDS FOR ARMOURED ELECTRIC CABLE
Filed Feb. 3, 1955

Inventor:
William Hawke
by: Michael S. Striker

United States Patent Office 2,858,358
Patented Oct. 28, 1958

2,858,358

CLAMPING GLANDS FOR ARMOURED ELECTRIC CABLE

William Hawke, Denton, Manchester, England

Application February 3, 1955, Serial No. 485,984

Claims priority, application Great Britain January 11, 1955

8 Claims. (Cl. 174—89)

This invention relates to clamping glands for electric cable of the type provided with an armouring of steel wire or other relatively hard metal, and has particular reference to the so-called compression type of gland in which the assembly together of coacting screw-threaded members causes the end of the armour to be gripped between a tubular part of the gland embracing the inner sheath of the cable and the interior of a metal ring which is compressed axially on tightening of the gland.

The object of the present invention is to provide an improved construction of compression-type gland which provides at least a dual clamping action (i. e. upon the armour and the inner sheath), and which furthermore enables the adjacent member thereof to be screwed into a tapped hole in a switch casing, junction box, or other metal fitting after the joint has been "made off," thus obviating the necessity for bodily rotation of the cable or fitting.

According to this invention, the improved gland comprises a tubular body through which the inner sheath of the cable can pass, an apertured cover member adapted for coaxial screw-threaded connection to said body, a rigid sleeve disposed between the components aforesaid so as to embrace said inner sheath, a metal ring adapted to be compressed axially, and thereby to clamp the cable armour around one end of said sleeve, when the gland is tightened, and a washer adapted under these conditions to be contracted upon the inner sheath of the cable by engagement between the other end of said sleeve and a shoulder in said body.

Preferably the cover member is internally threaded to engage an external screw-thread on the gland body, and the metal clamping ring may be engaged between a shoulder within the cover member and an abutment on the armour-supporting sleeve. Such abutment may take the form of a circumferential flange whose opposite face is engaged by the inner end of the body when the gland is tightened.

If desired, the outer end of the cover member may be externally screw-threaded to receive a nut and internally coned to accommodate a complementarily tapered washer embracing the outer sheath of the cable, the thicker end of said washer being engaged by a shoulder in said nut so that, when the latter is tightened, said outer sheath is clamped by said washer.

Furthermore, the outer end of the clamp body may be externally threaded to screw into a sealing box adapted to enclose the connections of the cable cores to other conductors and thereafter to be charged with an insulating compound.

Figure 1:
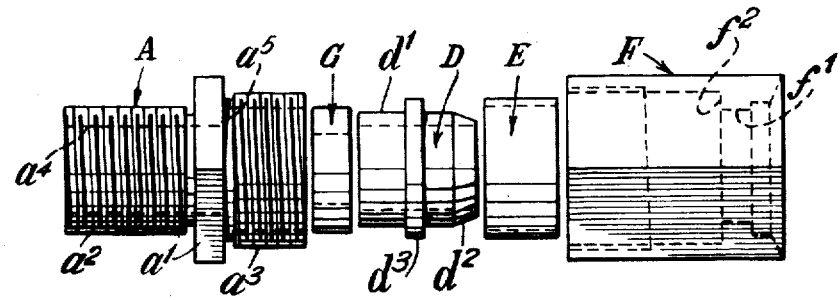
Fig. 1 is a side elevation of one form of the improved gland with the parts thereof separated one from another.
Figure 2:
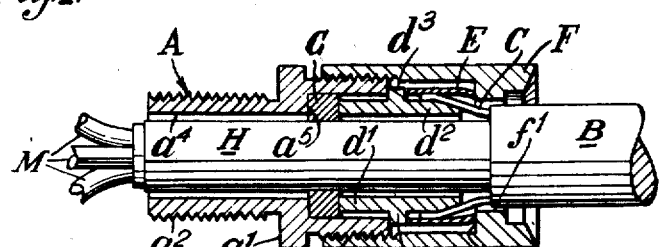
Fig. 2 is a sectional side elevation of the same gland assembled and operatively associated with the end of a cable.

In the example illustrated in Figs. 1 and 2, the hollow body A of the improved gland has a portion $a'$ of hexagonal or other non-circular section for engagement by a spanner or key and opposite ends $a^2$, $a^3$ thereof, which may be of different diameter, are screw-threaded externally.

The internal cavity $a^4$ of the clamp body, whose minimum diameter is sufficient to allow the cable end to be passed therethrough, with clearance, after the outer sheath B and armour C have been cut back to a suitable extent, has an enlargement $a^5$ at one end to accommodate, also with clearance, the end $d'$ of a sleeve D whose bore may correspond to the minimum diameter of the body A.

The other end $d^2$ of the sleeve D is radiused or tapered, and is loosely embraced by a metal ring E whose internal diameter is somewhat less than the sleeve end $d^2$ when the same has been overlaid with the armouring wires C as hereinafter described.

The end $a^3$ of the clamp body adapted to receive the sleeve D has associated therewith an internally-threaded cover member F whose outer end has a central aperture $f'$ larger than the overall diameter of the cable, but nevertheless small enough to provide a shoulder $f^2$ adapted to abut the adjacent end of the ring E when the assembled clamp is tightened. This cover member F is of hexagonal or other non-circular shape externally.

About midway of its length, the sleeve D is formed with a circumferential flange $d^3$ providing an abutment for the inner end of the ring E and also engageable by the inner end $a^3$ of the clamp body, a rectangular-section washer G which closely fits the inner sheath H of the cable being interposed between the shoulder $a^5$ within the body A and the adjacent end $d'$ of the sleeve D.

The clamp body A, cover member F, and sleeve D are formed of mild steel, cast iron, brass, zinc-base alloy, or any other suitable material, the ring E being preferably (but not necessarily) of copper or some other metal or alloy having a like ductility to copper, whilst the washer G may be of lead, aluminium, natural or synthetic rubber, or of any other suitable material according to the type of cable being dealt with.

In applying the gland to a cable (as shown in Fig. 2), the latter is passed through the cover hole $f'$, the outer sheath B and armour C are cut back for suitable distances, and the sleeve D and washer G are then slipped over the exposed inner sheath H of the cable and pushed home until the leading end $d^2$ of the sleeve engages within the armour C, its radiused or tapered nose providing the necessary "lead."

The cut end of the armour C is laid over the adjacent portion $d^2$ of the sleeve D and the assembly is then offered to the clamp body A which has previously been screwed into the wall of a switch casing or other fitting and, if desired, further secured by a lock-nut within the latter.

The clamp body A is, course, fixed in position with its wider end $a^3$ facing outwards to receive the washer G and sleeve D which embrace the inner sheath H of the cable.

When the cover member F is screwed home upon the clamp body A, in which position it may be secured by a lock-nut on the part $a^3$ of the latter the washer G is contracted upon the inner sheath H of the cable, so as effectively to clamp the latter, and simultaneously the ring E is forced over the splayed armouring wires C which are thereby clamped tightly upon the sleeve D. In the fully-tightened condition of the clamp, the sleeve flange $d^3$ is engaged between adjacent ends of the ring E and clamp body A.

Figure 3:
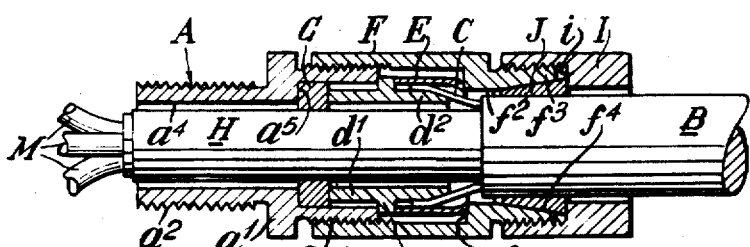
Fig. 3 is a view corresponding to Fig. 2, but showing a modified construction.

In the modified construction shown in Fig. 3, the cover member F is formed at its outer end with a coaxial hollow spigot $f^3$ in which is screw threaded externally to receive a nut I, the bore of such spigot having an inward taper as at $f^4$ and accommodating a wedge-section washer J of lead, aluminum, ebonite or other suitable material (depending upon the type of cable), whose outer end is engaged by a shoulder $i'$ in the nut as the latter is tightened. In this way, the washer J is contracted upon the outer sheath B of the cable and the gland rendered completely weatherproof.

Figure 4:
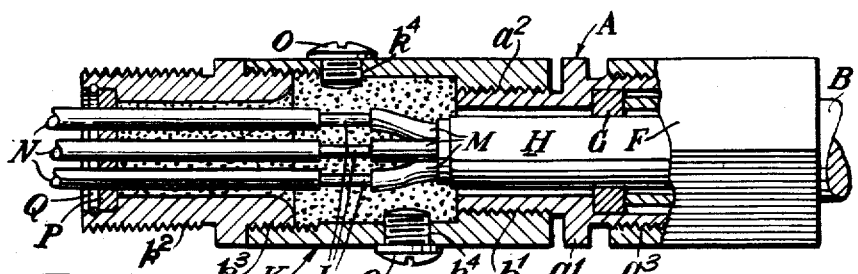
Fig. 4 is a part-sectional side elevation showing the gland of Figs. 1 and 2 associated with a sealing box.

In Fig. 4, the clamp body A instead of being screwed directly into a switch casing or other fitting, has its outer end $a^2$ engaged with an internal thread $k'$ in a sealing box K which encloses the connections L of the various cable cores M to other conductors N, the opposite end $k^2$ of such box being secured to the switch casing or its equivalent in known manner.

The sealing box is conveniently formed in two parts having a screw-threaded connection one to the other at $k^3$ and made of hexagon or other non-circular shape externally from a metal which may be similar to that used for the gland members A, D and F.

The part of the box K adjacent the gland body A is formed at spaced positions with holes $k^4$ normally closed by screw-plugs O, one such hole serving for introduction of an insulating compound, preferably under pressure, whilst the other permits escape of displaced air.

The other part of the box K may be of smaller internal diameter and rebated at its extremity to receive an insulating closure plate P with spaced outlets for the conductors N, such plate being retained by a circlip Q.

Instead of the gland body A (or sealing box K) having its end $a^2$ (or $k^2$) arranged to screw into the wall of a switch casing or equivalent fitting as aforesaid, it may in some cases have a spigot portion for engaging a plain hole in such wall and adjacent this spigot a circumferential flange adapted to be secured to the face of the fitting by means of studs around the periphery of said hole.

I claim:

1. A clamping arrangement comprising, in combination, a support sleeve adapted to encompass the inner sheath of an armoured cable; an inner sleeve coaxial with said support sleeve, said inner sleeve also being adapted to encompass the inner sheath of the armoured cable and being further adapted to be encompassed by the armour thereof; a sheath clamping ring coaxial with said sleeves and being arranged between the same, said sheath clamping ring having an inside diameter corresponding substantially to that of the sheath of the armoured cable and being made of a deformable material; an armour clamping ring coaxial with said inner sleeve and being arranged adjacent the same, said armour clamping ring having an inside diameter which is greater than the outside diameter of the bare sleeve but which is smaller than the outside diameter of the encompassed sleeve; and means for moving said sleeves toward each other, thereby axially compressing said sheath clamping ring so as to cause the same also to expand radially, and for moving said armour clamping ring axially onto the encompassed sleeve, said means being in the form of an outer sleeve adapted to encompass the armoured cable, said outer sleeve being coaxial with said support and inner sleeves and in threaded engagement with the former and also being adjacent said armour clamping ring so that when said outer and support sleeves are rotated relative to each other in such a manner as to be moved axially toward each other, said armour clamping ring is moved axially onto the encompassed sleeve whereby the sheath of a cable which is encompassed by said sleeves and said sheath clamping ring is clamped by the latter and whereby the armour of such sheath is clamped between said inner sleeve and said armour clamping ring.

2. A clamping arrangement as defined in claim 1 wherein the threaded engagement between said support and outer sleeves is effected by an external thread on said support sleeve cooperating with an internal thread on said outer sleeve.

3. A clamping arrangement as defined in claim 2 wherein said inner sleeve is formed with a tapered portion over which the armour of the cable is introduced so as to encompass said inner sleeve.

4. A clamping arrangement as defined in claim 2 wherein said inner sleeve is formed with an outer shoulder which is axially so positioned as to be engaged by said armour clamping ring when the same has been moved a predetermined axial distance onto the encompassed inner sleeve.

5. A clamping arrangement as defined in claim 4 wherein said outer shoulder is so dimensioned as to be engaged by said support sleeve when said outer and support sleeves are tightened onto each other.

6. A clamping arrangement as defined in claim 2, and additional clamping means operatively associated with said outer sleeve and being adapted to encompass the armoured cable for clamping the same.

7. A clamping arrangement as defined in claim 6 wherein said additional clamping means include an internally tapered sleeve adapted to be screwed onto said outer sleeve, and an externally tapered clamping member mating with said tapered sleeve and encompassing the cable, said tapered sleeve and said tapered clamping member being so arranged that when the former is screwed onto said outer sleeve, the cable is clamped by said tapered clamping member.

8. A clamping arrangement as defined in claim 2, and sealing means operatively associated with said support sleeve for sealing the free end thereof.

References Cited in the file of this patent

UNITED STATES PATENTS

| | | |
|---|---|---|
| 2,615,953 | Waite | Oct. 28, 1952 |
| 2,671,127 | Hope | Mar. 2, 1954 |
| 2,673,233 | Salisbury | Mar. 23, 1954 |
| 2,691,059 | Umina | Oct. 5, 1954 |

FOREIGN PATENTS

| | | |
|---|---|---|
| 923,110 | France | Feb. 10, 1947 |
| 983,318 | France | Feb. 7, 1951 |